United States Patent
Jordan et al.

(10) Patent No.: US 10,513,308 B2
(45) Date of Patent: Dec. 24, 2019

(54) BRAKE CONTROL APPARATUS

(71) Applicant: SRAM, LLC, Chicago, IL (US)

(72) Inventors: Brian T. Jordan, Highland Park, IL (US); Andreas Vonend, Waigolshausen (DE); Andreas Guender, Ramsthal (DE)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/472,648

(22) Filed: Mar. 29, 2017

(65) Prior Publication Data

US 2017/0197684 A1    Jul. 13, 2017

Related U.S. Application Data

(63) Continuation of application No. 13/524,885, filed on Jun. 15, 2012, now Pat. No. 9,630,677.

(51) Int. Cl.
*B62L 3/02* (2006.01)
*B62K 23/06* (2006.01)

(52) U.S. Cl.
CPC ............. *B62L 3/023* (2013.01); *B62K 23/06* (2013.01); *B62L 3/02* (2013.01)

(58) Field of Classification Search
CPC ........... B62L 3/02; B62L 3/023; B62K 23/02; B62K 23/06; B62M 25/04
See application file for complete search history.

(56) References Cited

U.S. PATENT DOCUMENTS

| | | | |
|---|---|---|---|
| 2,271,273 A | 1/1942 | Mueller et al. | |
| 3,935,930 A | 2/1976 | Kine | |
| 4,462,267 A * | 7/1984 | Shimano | B62K 21/12 74/489 |
| 4,771,649 A | 9/1988 | Modolo | |
| 4,921,081 A | 5/1990 | Chilcote | |
| 5,636,518 A | 6/1997 | Burgoyne et al. | |
| 6,095,309 A | 8/2000 | Mione | |
| 6,336,525 B1 | 1/2002 | Leng | |
| 6,484,855 B1 * | 11/2002 | Yaple | B62L 3/023 180/219 |
| 6,502,675 B1 | 1/2003 | Andrus | |
| 7,204,350 B2 | 4/2007 | Lumpkin | |
| 7,857,112 B1 | 12/2010 | Tsai et al. | |
| 2005/0056011 A1 | 3/2005 | Idei et al. | |
| 2006/0266594 A1 * | 11/2006 | Tsai | B62K 23/06 188/24.22 |
| 2007/0175290 A1 * | 8/2007 | Fujii | B62K 23/02 74/502.2 |
| 2009/0114057 A1 | 5/2009 | Fukui et al. | |

(Continued)

FOREIGN PATENT DOCUMENTS

| | | |
|---|---|---|
| EP | 0792795 A2 | 9/1997 |
| FR | 395042 A | 2/1909 |

(Continued)

*Primary Examiner* — Bradley T King

(57) ABSTRACT

A hydraulic brake control apparatus for attaching to an open ended handlebar of a vehicle, the handlebar having a longitudinal axis. The hydraulic brake control apparatus includes a brake housing that is attachable to the handlebar, the brake housing including a first section residing outside the handlebar, and a second section sized and shaped to be received inside the handlebar.

13 Claims, 7 Drawing Sheets

(56) References Cited

U.S. PATENT DOCUMENTS

| | | | |
|---|---|---|---|
| 2009/0121451 A1* | 5/2009 | Chiang | B62J 1/08 |
| | | | 280/288.4 |
| 2009/0152063 A1 | 6/2009 | Tsai | |
| 2011/0011197 A1* | 1/2011 | Oku | B60T 7/085 |
| | | | 74/473.12 |
| 2011/0031078 A1 | 2/2011 | Matsushita et al. | |
| 2011/0031079 A1* | 2/2011 | Matsushita | B60T 7/102 |
| | | | 188/344 |
| 2011/0048161 A1* | 3/2011 | Shipman | F16C 1/16 |
| | | | 74/502.2 |
| 2011/0135521 A1* | 6/2011 | Vezzoli | B60T 7/102 |
| | | | 417/429 |
| 2012/0200061 A1* | 8/2012 | D'Aluisio | B62K 23/06 |
| | | | 280/281.1 |
| 2012/0234130 A1* | 9/2012 | Yu | B62K 21/26 |
| | | | 74/551.9 |
| 2014/0041379 A1* | 2/2014 | Ruckh | B62L 3/023 |
| | | | 60/594 |

FOREIGN PATENT DOCUMENTS

| | | |
|---|---|---|
| FR | 59965 E | 9/1954 |
| GB | 190403651 A | 5/1904 |
| TW | M384267 U | 7/2010 |
| WO | 9013470 A1 | 11/1990 |
| WO | 9507836 A1 | 3/1995 |

\* cited by examiner

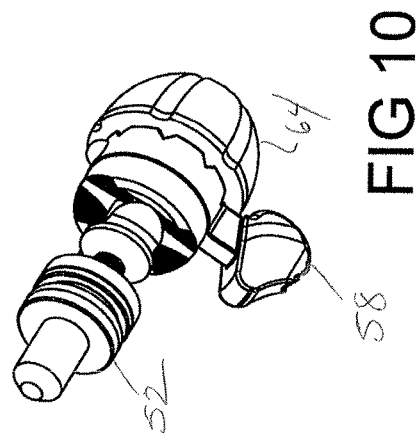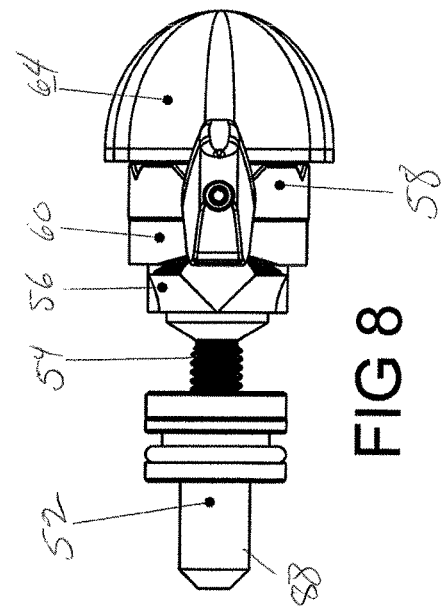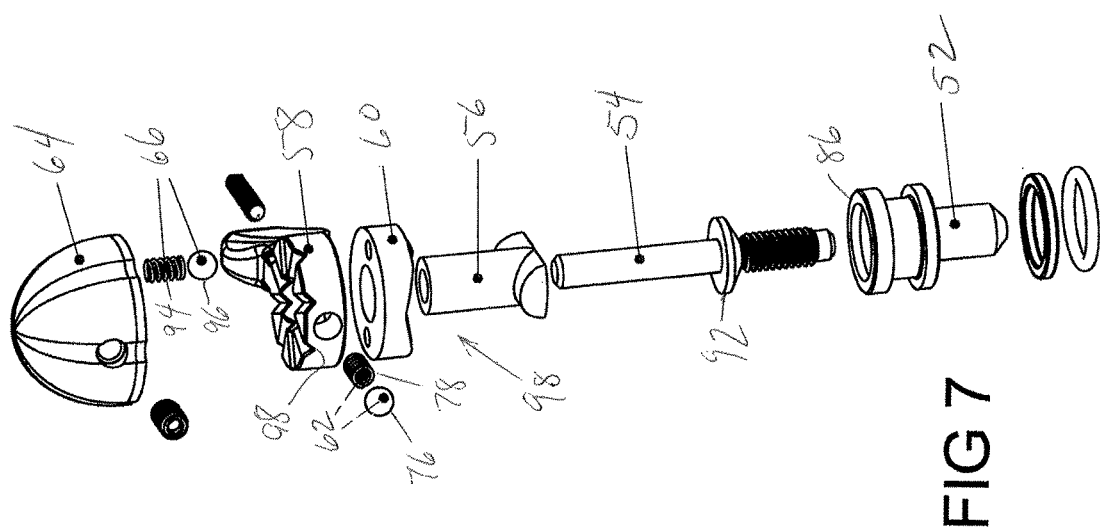

BRAKE CONTROL APPARATUS

This application is a continuation of U.S. patent application Ser. No. 13/424,885, filed Jun. 15, 2012, the content of which is herein included by reference in its entirety.

BACKGROUND OF THE INVENTION

The invention relates to brake systems. More particularly, the invention relates to brake control devices, which are used with a brake for engaging a wheel of a vehicle.

Many vehicles, such as bicycles, utilize a braking system that causes the application of pressure to a rotating wheel or a disc rotor mounted to a rotating wheel. Many of these braking systems utilize a mechanism with a hand lever to generate pressure with a hydraulic fluid. This pressure is transferred through a hydraulic line or conduit to a brake apparatus, which may include a caliper having brake pads, such that the hydraulic pressure is applied to the pads to squeeze the pads against the rotating part to impart a braking force thereto. The rotating part could be a wheel rim or a rotor, for example.

Two general types of brake systems are commonly seen in the bicycle market and these use different mechanisms to convey braking force from a hand lever mounted to the outside of a handlebar down to the wheel to stop the bicycle. The first, and typically least expensive way, is the use of a steel cable positioned in a housing which is pulled by the hand lever. This cable is connected to a brake caliper near the rim of a wheel and when pulled, generates force between paired brake pads. The resulting friction slows the bicycle. The other way is the use of hydraulic fluid in a hydraulic line to convey the hand-generated force down to the brake caliper. This hydraulic fluid is pushed by a master piston by operating a hand lever and pushes against a slave piston at or near the caliper, which causes the brake pads to move against the rim and slow the bicycle. Cable actuated brake systems may use different lever distances to increase the hand force and generate a higher brake force between the brake pads and rim, in contrast to hydraulic brakes which use different piston diameters to increase the hand force.

An advantage of hydraulic actuated brakes is the lower energy loss in the hydraulic line in contrast to the steel cable, especially when the steel cable is fished through the interior of the bicycle handlebar and frame member(s), because of the amount of friction created between the cable and the housing. This makes hydraulic brake systems an attractive option for road and triathlon bicycles. Triathlon and time trial style bicycles are designed to be very aerodynamic and the brake lines are typically hidden inside the handlebar and the frame to reduce drag. The triathlon and time trial style handlebar has a special shape to allow the rider to ride the bike in an aerodynamic position. For this reason, effective hydraulic brake systems are particularly advantageous when applied to triathlon and time trial bicycles.

BRIEF SUMMARY OF THE INVENTION

In light of the present need for an improved hydraulic brake control apparatus and in particular an apparatus that is provided in an overall ergonomic package, a brief summary of various exemplary embodiments is presented. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections, but it should be understood that minor variations of these concepts are contemplated by the invention.

Some aspects of the invention include a hydraulic brake control apparatus designed to work with a rim brake caliper and has a housing section that may be mounted at the forward/leading end of a triathlon style handlebar, preferably in an abutting fashion, i.e., in contact with the end of the handlebar, and a section that clamps in the interior on an inner surface of the handlebar and also may locate the hydraulic line outlet portion inside the handlebar. The hydraulic system may be closed and may omit compensating structure to address expansion of hydraulic fluid due to heat because a rim brake caliper does not heat brake fluid during braking (in contrast to a disc brake caliper). This closed system allows having both the quick release and the pad contact adjustment at the brake housing, which is convenient and comfortable to use, including during riding. A radial master cylinder may help to make the brake lever and apparatus very compact and aerodynamic and a symmetric working clamp mechanism driven by an offset screw leaves sufficient room in the middle of the housing to locate the hydraulic line port inside the handlebar. The brake control apparatus may easily be mounted to a handlebar and only one screw needs to be tightened.

One aspect of the invention is a brake control apparatus including a clamp mechanism for attaching the brake control apparatus to an open ended handlebar of a vehicle, the handlebar having an inside surface and a longitudinal axis. The clamp mechanism may include at least a part of a brake housing attachable to the handlebar, the brake housing including a first section residing outside the handlebar and a second section sized and shaped to be received inside an open end of the handlebar. The clamp mechanism arranged symmetrically about the second section of the brake housing to space apart the second section from the handlebar and operating to secure the brake housing to an inside surface of the handlebar by expanding radially. The clamp mechanism also including an adjustor, the adjustor accessible from the first section and extending through the first and second sections and being offset from said axis of the handlebar, a plurality of mounting parts shaped and sized to move radially outwardly and secure to the inside surface of the handlebar when a clamp nut is displaced relative to the second section by the adjuster, and one or more friction rings positioned radially outward of the mounting parts.

One aspect of the invention is a hydraulic brake control apparatus for attaching to an open-ended handlebar of a vehicle, the handlebar having a longitudinal axis. The apparatus includes a brake housing attachable to the handlebar. The brake housing includes a first section residing outside the handlebar and abutting the open end of the handlebar, and a second section sized and shaped to be received inside the handlebar. A master cylinder is disposed within the first section, the master cylinder having a master cylinder chamber with a chamber axis that is oriented transverse to the axis of the handlebar. A master cylinder actuator is provided in operative association with the master cylinder.

Another aspect of the invention is a hydraulic brake control apparatus for controlling the braking of a vehicle, the vehicle having a handlebar with a handlebar axis including a brake housing attachable to the handlebar. A master cylinder is disposed in the brake housing having a bore axis oriented transverse to the axis of the handlebar. A master cylinder actuator is pivotally attached to the housing and in operative association with the master cylinder. An adjustment cylinder is disposed in the brake housing in communication with the master cylinder, the adjustment cylinder including an adjustment cylinder chamber provided with a volume of fluid and one or both of a micro-adjust mechanism and a macro-adjust mechanism is provided that is operable upon the adjustment cylinder to change the fluid volume of the adjustment cylinder chamber.

Another aspect of the invention provides a clamp mechanism for attaching a brake control apparatus to an open ended handlebar of a vehicle, the handlebar having an inside surface and a longitudinal axis, including a brake housing attachable to the handlebar, the brake housing including a first section residing outside the handlebar and a second section sized and shaped to be received inside the open end of the handlebar, the clamp mechanism arranged symmetrically about the second section of the brake housing to space apart the second section from the handlebar and operating to secure the brake housing to the inside surface of the handlebar by expanding radially, the clamp mechanism including an adjustor, the adjustor accessible from the first section and extending through the first and second sections and being offset from said axis of the handlebar.

These and other features and advantages of the present invention will be more fully understood from the following description of one or more embodiments of the invention, taken together with the accompanying drawings.

BRIEF DESCRIPTION OF THE SEVERAL VIEWS OF THE DRAWINGS

FIG. 7 is an exploded view of the micro-adjust and macro-adjust mechanisms of the brake control apparatus of FIG. 1;

FIG. 8 is a top view of the mechanisms of FIG. 7;

FIG. 10 is a perspective rear view of the of the brake control apparatus of FIG. 8.

DETAILED DESCRIPTION OF THE INVENTION

Figure 1:
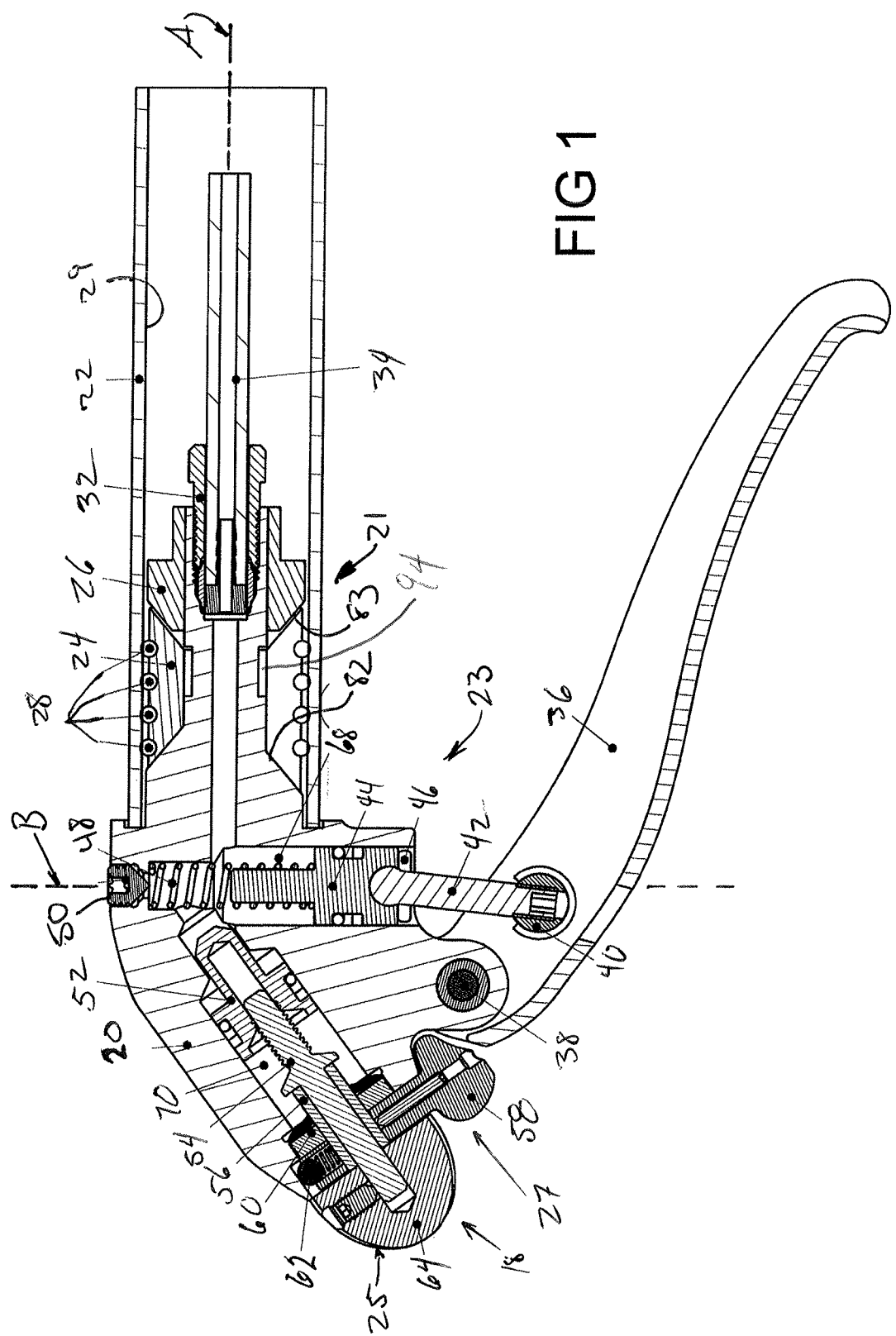
FIG. 1 is a cross-sectional view of a brake control apparatus according to one embodiment of the invention.

Preferred embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "upper" and "lower," or "forward" and "rearward" are used for the sake of clarity and not as terms of limitation. Moreover, the terms may refer to bicycle mechanisms conventionally mounted to a bicycle and with the bicycle oriented and used in a standard fashion unless otherwise indicated.

The figures illustrate a brake control apparatus 18 for a handlebar steered vehicle, such as a bicycle, including "triathlon" or "time trial" style bicycles, for example, according to an embodiment of the invention. All of many of the features may be adapted or incorporated into brake systems for other types of bicycles and the like.

The brake control apparatus 18 includes a housing 20, and a clamp mechanism 21, which may clamp the housing second section 20B into an inside surface 29 of a handlebar 22 of the vehicle. It will be understood that the handlebar 22 is mountable to a bicycle and when so mounted may extend forwardly and receives the brake control apparatus 18 in an open end of the handlebar, i.e., according to the direction of travel of the vehicle during standard forward operation.

The brake control apparatus 18 increases and decreases fluid pressure in the apparatus to actuate the brakes. The brake control apparatus 18 may also include a micro-adjust mechanism 25 which operates to change the total fluid volume in the housing to adjust the clearance between the brake pads and a corresponding wheel rim (not shown). The brake control apparatus 18 may also include a macro-adjust mechanism 27 that quickly increases or decreases the clearance between brake pads and a wheel rim (preferably in one step or motion) to allow a rider to easily install and remove the wheel from the bicycle.

The brake control apparatus 18 may include all or any of the master cylinder 69', micro-adjust mechanism 25, and macro-adjust mechanism 27 in a first section 20A of the housing 20. The clamp mechanism 21 may be considered to be attached to a second section 20B of the housing 20.

The housing 20 may take a wide range of forms according to the desired overall shape of the brake apparatus and the desired elements and mechanisms housed therein or attached thereto. The housing 20 includes a master cylinder 69' defined at least in part by a master cylinder bore 68, which has a bore axis B that may be oriented transverse or perpendicular to the axis A of the handlebar 22 to which the housing is attachable. In embodiments where the bore 68 is transverse or perpendicular to the axis A of the handlebar, the master cylinder 69' may be a radial master cylinder. The master cylinder 69' may be spaced from the end of the bar. The handlebar axis A may intersect the master cylinder 69'.

The master cylinder chamber 69 has a narrow diameter portion 71 (FIG. 2A) for housing spring 48. At or near the top of the housing 20, above the main part of chamber 69 and the narrow diameter portion 71 is a hole or bleed port 73 (FIG. 2A), which is normally occupied and closed by the bleed screw 50, and may be opened to atmosphere to add or extract fluid or permit the escape of air. The bleed port 73 may have an undercut, and may be sealed with the housing by the screw 50 and an O-ring or the like, as is well known.

At the forward end of the housing first section 20A is an adjustment cylinder bore 70 at least in part defining an adjustment cylinder 75' in fluid communication with the master cylinder 69'. The adjustment cylinder bore 70 may be angled, such that air is permitted to rise to and exit the bleed port 73. Accordingly, the adjustment cylinder 75' and master cylinder 69' may communicate at or near an upper part of the housing 20 in a position such that air may rise to and then exit the bleed port 73 when the bleed port is open.

In the first section of housing 20A is formed a perpendicular or transverse hole 84 (FIG. 2A) (relative to axis A and B) formed through the housing, which is sized and shaped to receive a pivot pin 38 (FIGS. 1, 3-6). An actuator 36 is pivotally carried on the pivot pin 38. The actuator 36 may be a lever. The hole 84 is formed through the housing 20A in a position that is relatively radially outboard from axis A and the position of the master cylinder bore 68. Also the hole 84 may be considered to be between the master cylinder bore 68 and the adjustment cylinder bore 70.

Figure 2B:
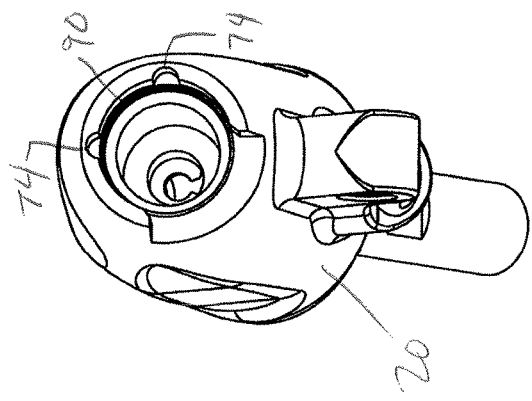
FIG. 2B is a perspective front view of the housing of FIG. 2A.
Figure 2A:
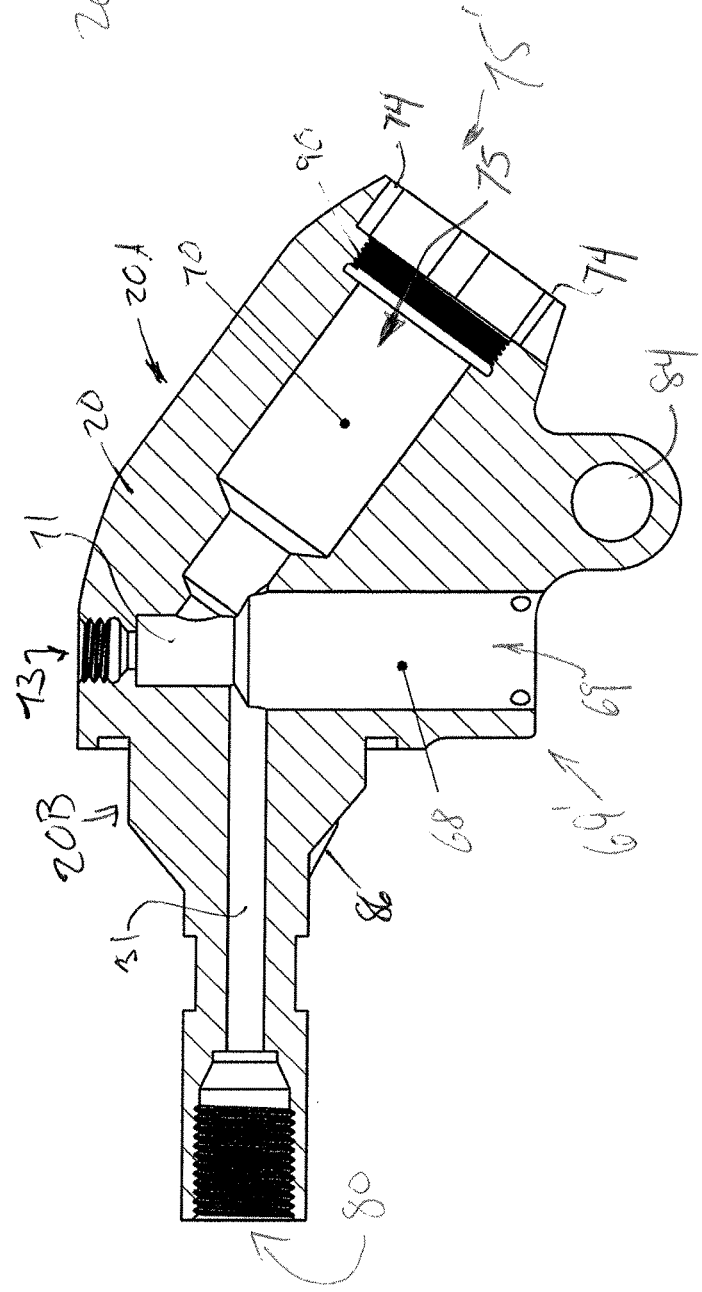
FIG. 2A is a cross-sectional side view of the housing portion of the brake control apparatus of FIG. 1.

FIG. 2A is a cross section of the housing 20. The adjustment cylinder bore 70 may have a threaded portion 90 to permit a stop bolt 60 (FIG. 1) to connect to the housing 20. At or near an outermost portion of the adjustment cylinder bore 70, which outermost portion may be a larger diameter than the more inwardly located bore portions, two or more rounded detents, cavities or indentations 74, may be spaced apart, for example about 90 degrees, for interacting with a macro-adjust detent mechanism 62. The macro-adjust detent mechanism 62 may include a ball 76 biased into the indentations 74 by a spring 78, or the like. The macro-adjust detent mechanism 62 interacts with the detents or indentations 74 in the housing 20, to releasably retain a macro-adjust lever 58 in a first or second position, dependent upon which one of the indentations are engaged by the macro-adjust detent mechanism. The positions correspond to relatively opened or closed positions of the brake pads (not shown). Thus, the macro-adjust detent mechanism 62 ensures that the macro-adjust mechanism 80 will not operate accidently.

The passage 80 opening at the left end of the housing second section 20B (FIG. 2A) may be internally threaded and is shaped and sized to receive a hydraulic line 34 and connector 32. The passage 80 is in fluid communication with both the adjustment cylinder chamber 75 and the master cylinder chamber 69.

The right section 20B (i.e., innermost end) of the housing 20 (FIG. 1) has a first cone-shaped end 82 that may be tapered, e.g., cone-shaped as in a non-concave cone, with one or more optional anti-rotation features 86 (FIG. 3), for example three radially extending ribs, where the clamp mechanism 21 is located. The housing 20B may have flat surfaces 94 to receive a tool, such as a wrench, for tightening the hydraulic line connector 32.

Figure 3:
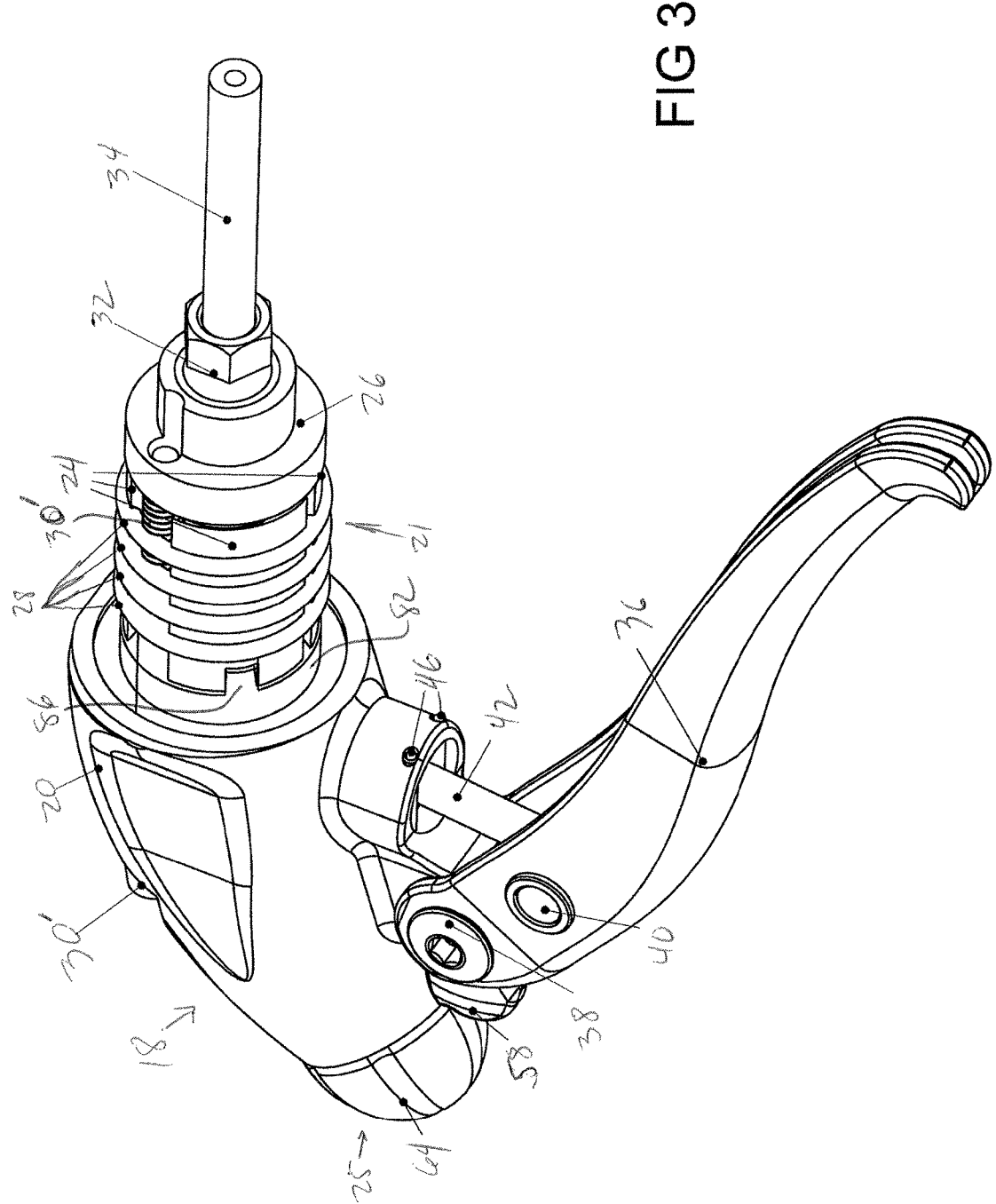
FIG. 3 is a perspective rear view of the brake control apparatus of FIG. 1.
Figure 4:
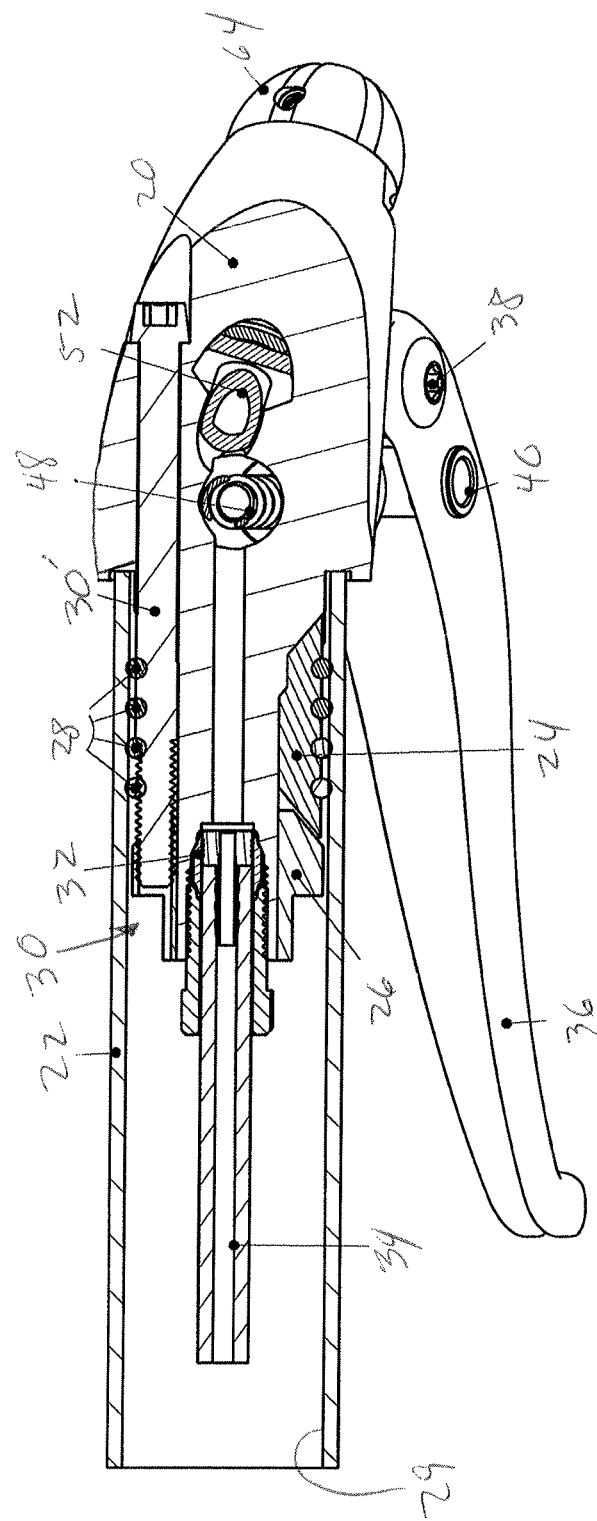
FIG. 4 is a perspective top view with a cross-sectional view through the axis A shown in FIG. 1.

FIG. 3 is a perspective view and FIG. 4 is a cross-sectional view of an embodiment of a handlebar clamp mechanism 21 of the brake control apparatus 18. The clamp mechanism 21 may be used to clamp a wide-range of devices to a handlebar, for example. The clamp mechanism 21 may be arranged symmetrically about housing second section 20B and adjusted by an offset clamp adjuster 30, which may include threaded screw 30' and clamp nut 24 parts. The clamp mechanism also generally includes, in the illustrated embodiment, three mounting parts 24 and four friction rings 28. It will be understood that other numbers of parts could be substituted for those illustrated.

The clap screw 30' extends through the housing 20 and is operatively coupled to the clamp nut 26, in one embodiment by a threaded connection, to form a clamp adjustor 30. The clamp nut 26 may have an inclined surface 83 at the left (facing the housing) in the form of a second cone-shaped surface that may cooperate with the housing second section 20B inclined surface 82 (FIG. 1). These two surfaces contact corresponding surfaces of the three mounting parts 24, positioned between the nut 26 and housing second section 20B. When urged together, the two surfaces 82, 83 tend to urge the structure interposed therebetween in a radially outward direction. The mounting parts 24 may be over-wrapped and/or held by the friction rings 28, which are positioned thereabout, and which also cause frictional contact between the mounting parts and the inner surface of the handlebar 22 when inserted therein. The clamp nut 26 extends at the right side (FIG. 1) a distance sufficient to distribute the side load created by the radial offset of the adjustor screw 30' from the axis A shared by the clamp nut (see FIGS. 1, 3, and 4).

Figure 5:
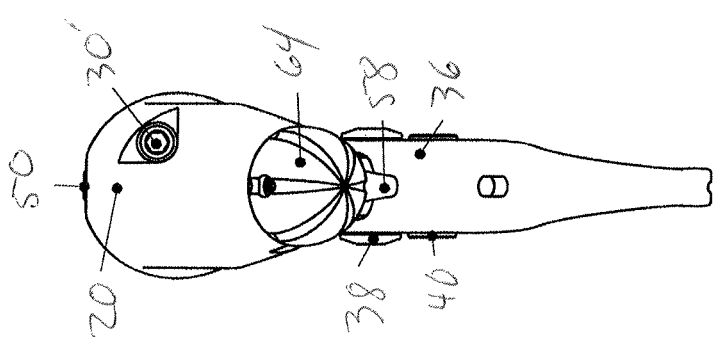
FIG. 5 is a front view of the brake control apparatus of FIG. 1.
Figure 6:
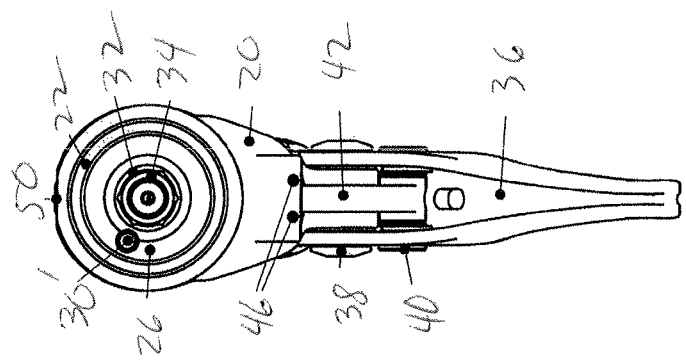
FIG. 6 is a rear view of the brake control apparatus of FIG. 1.
Figure 9:
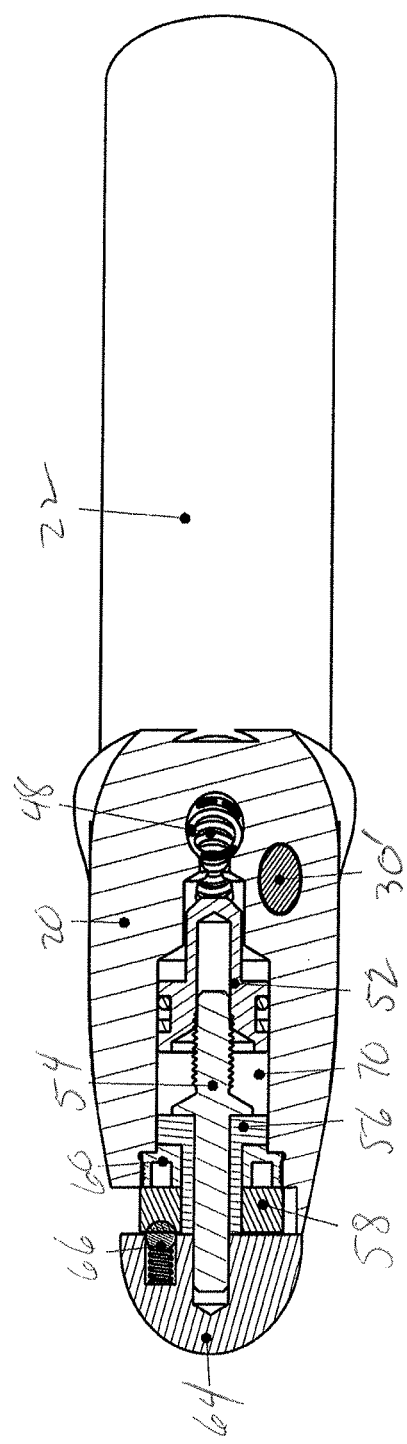
FIG. 9 is a cross-sectional top view of the of the brake control apparatus of FIG. 1.

FIG. 5 shows the front view and FIG. 6 shows the back view of the housing 20 and brake actuator 36. In particular, the offset adjuster screw 30' can be seen in FIG. 5 set in the first section 20A and extending through and along the second section 20B to operate the clamp mechanism 21 when the screw is rotated in the illustrated embodiment.

FIG. 1 is an embodiment of the brake control apparatus 18 including an actuator 36, a pivot pin 38, a rod pin 40, a rod 42, a master piston 44, a spring 48, a bleed screw 50, and two stop pins 46. The actuator 36 pivots on the pivot pin 38, which pin may be fixed to the housing 20. The rod pin 40 is attached to the actuator 36 and the rod 42 is adjustably engaged with the rod pin. The rod 42 operatively connects the actuator 36 to the master piston 44 and may be a threaded connection on the end adjacent the actuator 36 and a ball and socket type connection on the opposite side with the master piston 44.

The master piston 44 is slidably disposed in the master cylinder bore 68 and at least in part with the bore defines the master cylinder chamber 69 and thus the master cylinder 69'. The master piston 44 may be sealed to the bore 68 with a backup ring and an O-ring, as is well known, to seal hydraulic fluid in the master cylinder chamber 69. At an outer end of the master cylinder chamber 69 may be a pair of transverse or perpendicular holes formed in the housing for receiving stop pins 46, e.g., two pins, which prevent the ball end of the rod 42 from coming out of the bore 68 by being spaced apart a distance less than the diameter or the ball end. The pins 46 also function to prevent the master piston 44 from backing out of the master cylinder bore 68. The pins 46 may be any suitable structure or means of preventing the exit of the master piston 44 from the master cylinder. The spring 48 is positioned inside the master cylinder chamber 69 to bias the master piston 44 in a direction out of the chamber. The master piston 44 may have a portion which is a smaller diameter than the inner diameter of the spring 48 and thus may function to hold the spring. The upper end 71 of the master cylinder bore 68 has a larger inner diameter than the outer diameter of the spring 48 and thus may house the spring at the upper end. At the top of the master cylinder bore 68 is a hole 73 formed through the housing, which may be threaded for receiving the bleed screw 50 and at the end of this threaded hole may be a round undercut for an O-ring (not shown), which seals the hydraulic fluid in the master cylinder chamber 69 with the bleed screw.

FIGS. 7-10 show the micro-adjust mechanism 25 and parts of the macro-adjust mechanism 27, including an adjustment piston 52, an adjustment screw 54, a quick release slider 56, a stop bolt 60, a macro-adjust lever 58, and an adjuster 64, which may be in the form of an adjustment wheel or knob, a macro-adjust detent mechanism 62, and an adjustment wheel detent mechanism 66. While the micro-adjust mechanism 25 and the macro-adjust mechanism 27 are shown on the first section 20A of the housing, the location may be modified to accommodate other types of control devices.

The adjustment piston 52 is slidably disposed in the adjustment cylinder bore 70, and at least in part defines with the bore the adjustment chamber 75 and thus the adjustment cylinder 75' and may be sealed with a backup ring and an O-ring, as is known with hydraulic brake systems in general.

The adjustment piston 52 moves to increase and decrease the oil volume in the adjustment cylinder chamber 75, and thus the total combined fluid volume in the adjustment cylinder chamber and master cylinder chamber 69, dependent upon its position and direction in the bore 70 (FIG. 2). The adjustment piston 52 may have a threaded blind hole 87 at the outer-facing side and a smaller outer diameter 88 at an opposite end that fits to the inner end of the adjustment cylinder bore 70. The adjustment screw 54 is rotatably disposed through the macro-adjust slider 56 and may be fixed against axial movement in the slider 56 with a flange like stop 92 at the inside and with the clamped adjustment wheel 64 at the outside. This adjuster 64 may be any suitable shape, knob, lever or the like that is graspable and/or movable by a user and may be fixed to the adjustment screw 54 with a set screw or any suitable fastening means. The adjustment screw 54 may be threaded above the stop 92 and thus threadably engaged with the adjustment piston 52.

The macro-adjust lever 58 may be fixed to the macro-adjust slider 56 with a set screw or any suitable fastening means and the macro-adjust slider can slide and turn inside the stop bolt 60. The macro-adjust slider 56 is shown connected to the stop bolt 60 with a cam follower connection 98 including two sliding surfaces which are perpendicular to the adjustment cylinder bore 70. Rotation of the macro-adjust lever 58 rotates the cam shaped mounting surface 98 between the inner side of the stop bolt 60 and the adjustment piston 52 causes an axial movement of piston 52.

The macro-adjust lever 58 may include the radially operating macro-adjust detent mechanism 62. This mechanism includes a spring 78 which pushes a ball 76 into one of two or more round grooves or detents 74 of the housing 20 and may hold the macro-adjust lever 58 into the detent. The detents 74 are spaced apart, for example about 90 degrees. The adjustment wheel 64 also may have an axially operating adjustment wheel detent mechanism 66. This mechanism is also built up of a spring 94 which pushes a ball 96 into a V-shape groove or detent 98 at the outer side or face of the quick release lever 58 and holds the adjustment wheel 64 at one of a number of rotational positions, e.g., eight positions in one complete rotation.

The brake apparatus 18 is secured to the handlebar 22 by inserting the second section 20B into the open end of the handlebar and operating the adjuster 30. The threads inside the clamp nut 26 convert the circular motion of the adjustor screw 30' into an axial movement and the cone shaped surface of the clamp nut 26 pushes at the adjacent cooperating surfaces of the mounting part 24. The other of the cooperating surfaces of the mounting part 24 push against the cone shaped surface 82 of the housing second section 20B. The axial movement of the clamp nut 26 caused by the respective surfaces is converted into an outwards movement of the mounting parts 24. The elastic friction rings 28 will also move radially on the mounting parts 24 and will be pressed between the mounting parts and the inside surface 29 of the handlebar 22 to increase the clamping force therebetween. Tightening of the offset adjuster screw 30' increases the force between the mounting parts 24 and the inner surface of the handlebar 22 which causes a secure friction fit between the housing 20 and the handlebar 22. If the offset adjuster screw 30' is turned to loosen, the clamp nut 26 makes an axial movement to the right and the mounting parts 24 are pushed radially inwardly by the friction rings 28, thus the friction fit is released and the housing 20 can be removed from the handlebar 22. The rings 28 are not necessary to the clamp mechanism, but embody one embodiment, and do function to add friction.

Operation of the actuator 36 creates a torque which causes the actuator to pivot around the pivot pin 38. The load is transferred through the rod pin 40 into the rod 42 and urges the master piston 44 into the bore 68 and thus the master cylinder chamber 69. The master piston 44 pushes against the bias of spring 48 and causes the flow of hydraulic fluid through the hydraulic line 34 into the brake caliper (not shown) until the brake pads (not shown) contact the rim. Upon pad contact with the rim, the master piston 44 does not appreciably continue to move and the force of the pads on the rim increases correspondingly with the increase of the pressure of the hydraulic fluid. The spring 48 is also axially compressed during this process and when the hand load is reduced, the spring uses the stored energy created during compression to urge the master piston 44 back until the ball end of the rod 42 comes to rest in contact with the two stop pins 46.

Operation of the micro-adjust mechanism 25 provides for increases and decreases in the total hydraulic fluid volume of the housing 20 in order to adjust the clearance between the brake pads and the rim (not shown). The brake apparatus 18 preferably has two different operating adjustment controls with different feed motions. The macro-adjust mechanism 27, which causes a relatively large feed motion of the adjustment piston 52 by rotating the macro-adjust lever 58 a select amount, e.g., 90 degrees, and the micro-adjust mechanism 25, which causes a lesser feed motion of the adjustment piston 58 by turning the adjustment wheel 64.

The macro-adjust mechanism 27 increases or decreases the clearance between the brake pads and the rim, e.g., in one step, to allow the rider to remove a wheel from the frame. By turning the macro-adjust lever 58, e.g., about 90 degrees, the sliding surface 98 between the macro-adjust slider 56 and the mounting surface of the stop bolt 60 and causes an axial movement of the macro-adjust slider 56, the macro-adjust lever 58, the adjustment screw 54, the adjustment wheel 64 and the adjustment piston 52.

During this process operated in the release direction, the fluid volume of the housing 20 increases and hydraulic fluid is pulled in through the hydraulic line 34 and out of the brake caliper. This causes movement of the slave piston in the brake caliper (not shown) and the brake pads to open up (i.e., the space between respective brake pads) in order to provide the clearance to remove or install the wheel out of or into the vehicle frame.

By turning the macro-adjust lever 58 in the opposite direction from that described above, the sliding surface of the macro-adjust slider 56 follows the mounting surface 98 of the stop bolt 60 and causes an axial movement in the other direction and the fluid volume of the housing 20 decreases and fluid is pushed back into the brake caliper causing the pads to move together. Both positions of the macro-adjust lever 58 may be retained with the macro-adjust detent mechanism 62. The spring 78, which may be located in the macro-adjust lever 58, pushes a ball 76 into a round groove 74 of the housing 20 and the angular position of the macro-adjust lever 58 may be thus retained. Before turning the macro-adjust lever 58 to another position, the torque needs to overcome the spring force of the macro-adjust detent mechanism 62, which urges the ball 76 into the groove 74 of the housing 20.

The micro-adjust mechanism 25 also provides a pad contact adjustment with an appropriate, lesser feed motion (relative to the macro-adjustment mechanism for a select amount of rotation thereof) by turning the adjustment wheel 64 a selected amount. It will be understood that for any given or select amount of rotation that the macro-adjust mechanism 27 will produce a relatively greater motion of the piston 52 than the micro-adjust mechanism 25.

The adjustment wheel 64 is connected to the adjustment screw 54, which is rotatably connected to the adjustment piston 52 by a threaded connection. The threads convert the rotational motion of the wheel 64 into an axial motion of the adjustment piston 52 and the fluid volume of the housing 20 increases or decreases depending upon the rotational direction of the adjustment wheel 64, producing a corresponding change in distance between the brake pads and the rim (not shown). The angular position of the adjustment wheel 64 may be movably retained in a number of positions by the adjustment wheel detent mechanism 66. The spring 94 of the detent mechanism 66 urges a ball 96 into the V-groove 98 of the macro-adjust lever 58 and the torque needs to be higher than the spring force to turn the adjustment wheel 64.

In one embodiment, the macro-adjust detent mechanism 62 includes a stronger spring retention arrangement than that of the adjustment wheel detent mechanism 66, such that the adjustment wheel 64 does not carry and turn the macro-adjust lever 58 when the adjustment wheel is turned.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A brake control apparatus including a clamp mechanism for attaching the brake control apparatus to an open ended handlebar of a vehicle, the handlebar having an inside surface and a longitudinal axis, comprising:
    a brake housing attachable to the handlebar, the brake housing including a first section residing outside the handlebar and a second section sized and shaped to be received inside an open end of the handlebar,
    the clamp mechanism arranged symmetrically about the second section of the brake housing to space apart the second section from the handlebar and operating to secure the brake housing to an inside surface of the handlebar by expanding radially, the clamp mechanism including:
    an adjustor, the adjustor accessible from the first section and extending through the first and second sections and being offset from said axis of the handlebar,
    a plurality of mounting parts shaped and sized to move radially outwardly and secure to the inside surface of the handlebar when a clamp nut is displaced relative to the second section by the adjustor, and
    one or more friction rings positioned radially outward of the mounting parts,
    wherein a brake line is received by a passage in the second section of the brake housing that is oriented radially inward of the plurality of mounting parts of the clamp mechanism.

2. The apparatus of claim 1, wherein the adjustor includes the clamp nut and a clamp screw threadably received by the clamp nut.

3. The apparatus of claim 1, wherein the second section includes a first cone-shaped surface.

4. The apparatus of claim 3, wherein the clamp nut includes a second cone-shaped surface shaped to cooperate with the first cone-shaped surface to act upon the mounting parts.

5. The apparatus of claim 4, wherein the mounting parts are shaped to be displaced radially when the first and second cone-shaped surfaces are drawn together by the adjustor.

6. The apparatus of claim 1, wherein the one or more friction rings are disposed radially outward of the mounting parts throughout an entirety of a circumference of the clamp mechanism.

7. The apparatus of claim 1, wherein the one or more friction rings are configured to contact the inside surface of the handlebar.

8. The apparatus of claim 1, wherein the brake line received by the passage in the second section of the brake housing comprises a fluid conduit.

9. The apparatus of claim 8, wherein the conduit extends along the handlebar axis and radially inward of the plurality of mounting parts of the clamp mechanism wherein the conduit is in fluid communication with a radial master cylinder formed in the first section of the housing.

10. The apparatus of claim 8, wherein the conduit extends coaxial with said axis of the handlebar.

11. The apparatus of claim 1, wherein the housing comprises a hydraulic master cylinder.

12. The apparatus of claim 1, further comprising a piston configured to apply pressure to fluid in the brake line.

13. The apparatus of claim 12, further comprising a fluid reservoir in fluid communication with the piston.

* * * * *